United States Patent [19]

De Lattre

[11] Patent Number: 5,704,256
[45] Date of Patent: Jan. 6, 1998

[54] DEVICE FOR FASTENING A SHOE ON A PEDAL, AND SHOE AND PEDAL WITH SUCH A DEVICE

[76] Inventor: Bertrand De Lattre, 28 Avenue de la Porte de Villiers, 75017 Paris, France

[21] Appl. No.: 535,187

[22] PCT Filed: Apr. 5, 1994

[86] PCT No.: PCT/FR94/00376

§ 371 Date: Oct. 27, 1995

§ 102(e) Date: Oct. 27, 1995

[87] PCT Pub. No.: WO94/26582

PCT Pub. Date: Nov. 24, 1994

[30] Foreign Application Priority Data

May 10, 1993 [FR] France ............... 93 05561

[51] Int. Cl.⁶ ..................................... G05G 1/14
[52] U.S. Cl. ............................ 74/594.6; 36/131
[58] Field of Search ................. 74/594.6, 594.4; 36/131, 132; 403/DIG. 1

[56] References Cited

U.S. PATENT DOCUMENTS

| | | | |
|---|---|---|---|
| 550,409 | 11/1895 | Hanson | 74/594.6 |
| 588,038 | 8/1897 | Tudor | 74/594.6 |
| 3,537,719 | 11/1970 | Gottfried | |
| 3,927,897 | 12/1975 | Olson et al. | |
| 4,103,563 | 8/1978 | Genzling | 74/594.5 |
| 4,735,107 | 4/1988 | Winkie | 74/594.6 |
| 4,827,633 | 5/1989 | Feldstein | 74/594.6 |
| 5,170,574 | 12/1992 | Weisbrich | 36/131 |
| 5,284,066 | 2/1994 | Weiss | 74/594.6 |
| 5,473,963 | 12/1995 | Aeschbach | 74/594.6 |

FOREIGN PATENT DOCUMENTS

| | | | |
|---|---|---|---|
| 2705080 | 11/1994 | France | 74/594.6 |
| 2835720 | 2/1980 | Germany | |
| 3-243488 | 10/1991 | Japan | |

OTHER PUBLICATIONS

Patent Abstracts of Japan, vol. 16, No. 034 (M-1204), Jan. 28, 1992.

*Primary Examiner*—Charles A. Marmor
*Assistant Examiner*—Saúl J. Rodríguez
*Attorney, Agent, or Firm*—Greenblum & Bernstein, P.L.C.

[57] ABSTRACT

A device for fastening a shoe to a pedal, e.g., a bicycle pedal, is light in weight and allows a cyclist to walk comfortably when wearing the shoes. The fastening device includes a magnetic element attached to at least one of the shoe and the pedal. A metallic element, which cooperates with the magnetic element, is attached to at least one of the shoe and the pedal. A spacer system is capable of moving the shoe and the pedal away from each other in a direction increasing an airgap between the magnetic element and the metallic element. The spacer system includes circumferential ramps carried by at least one of the shoe and the pedal, such that relative rotation of the shoe and the pedal causes movement of the shoe and the pedal away from each other.

25 Claims, 3 Drawing Sheets

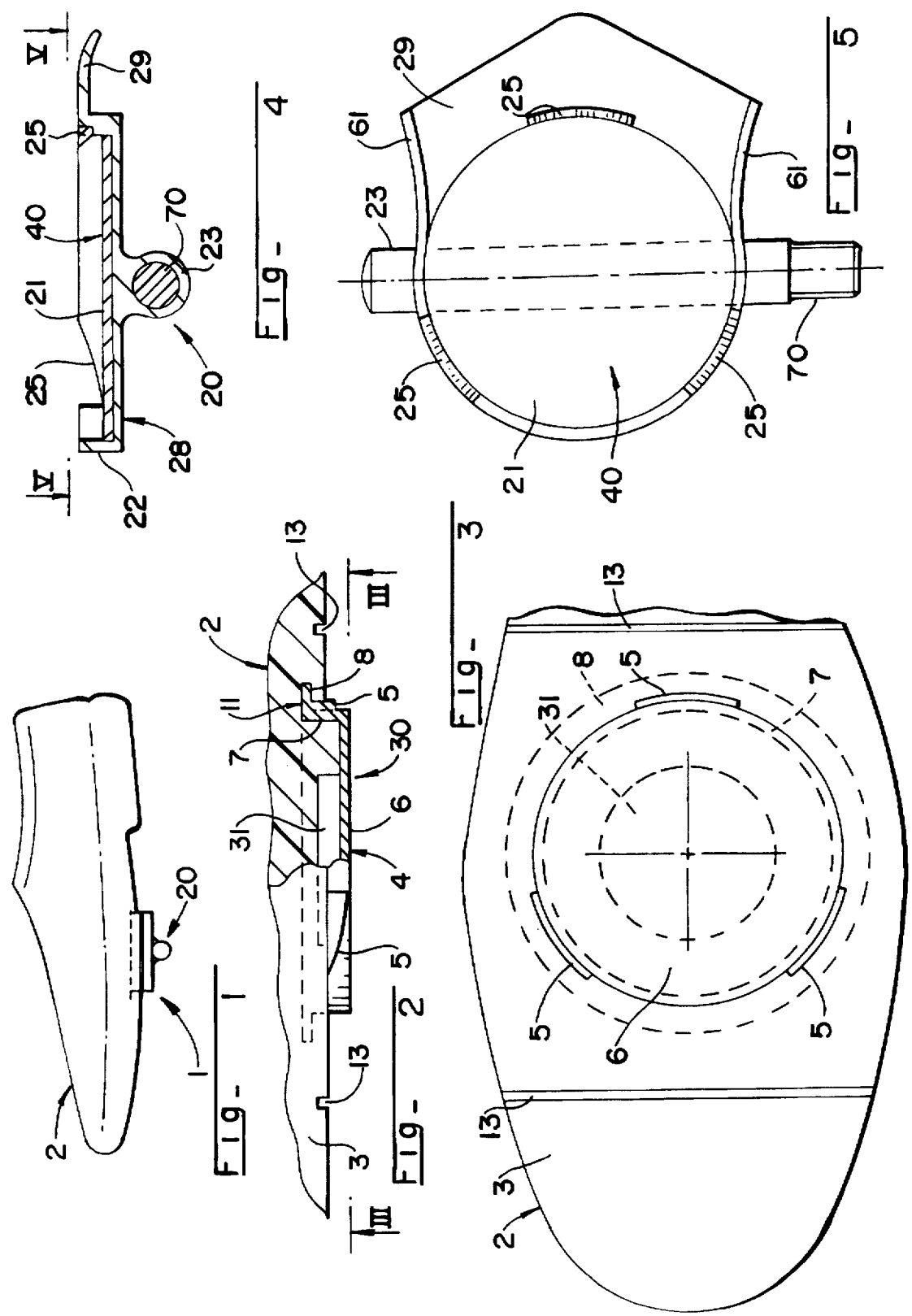

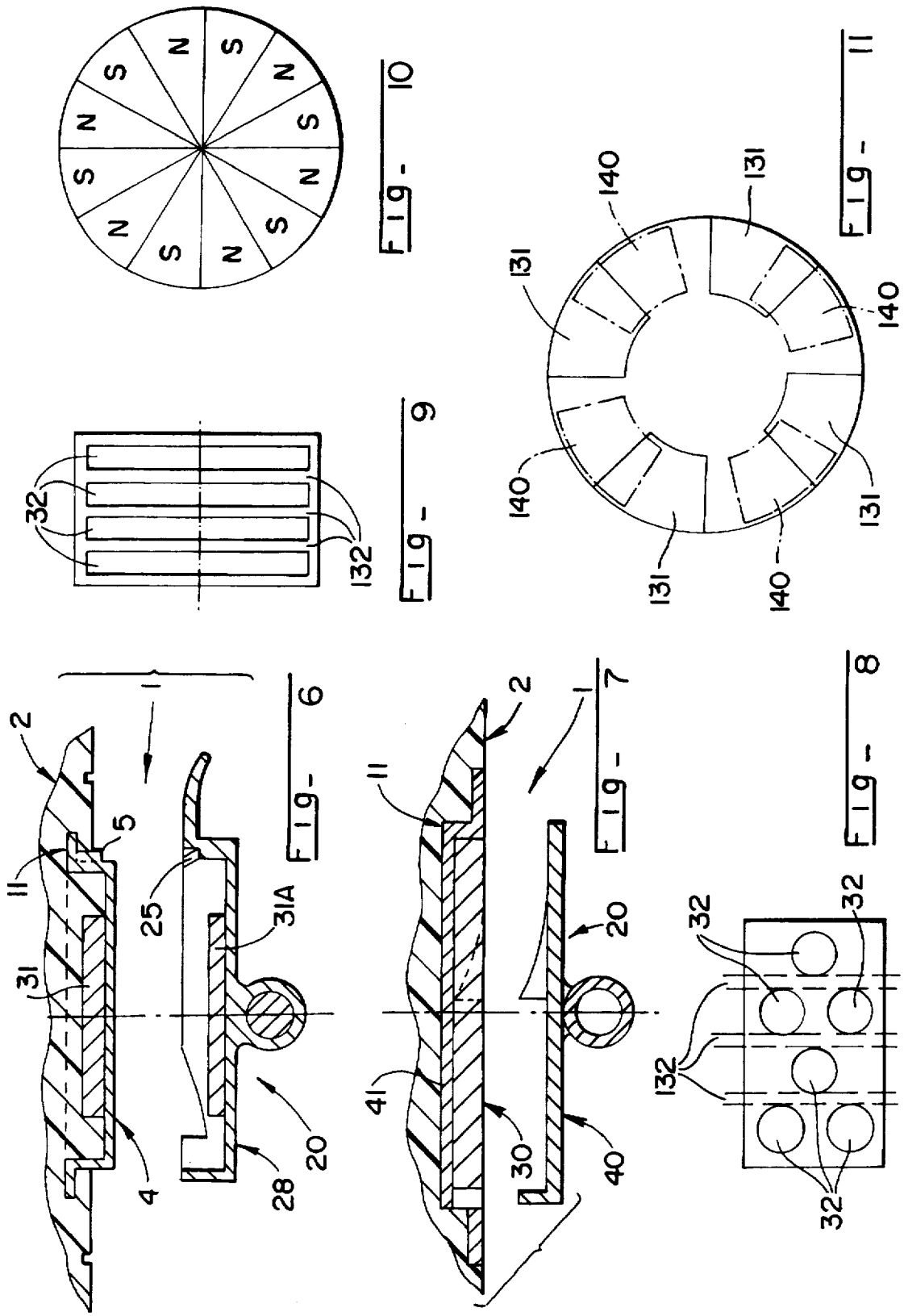

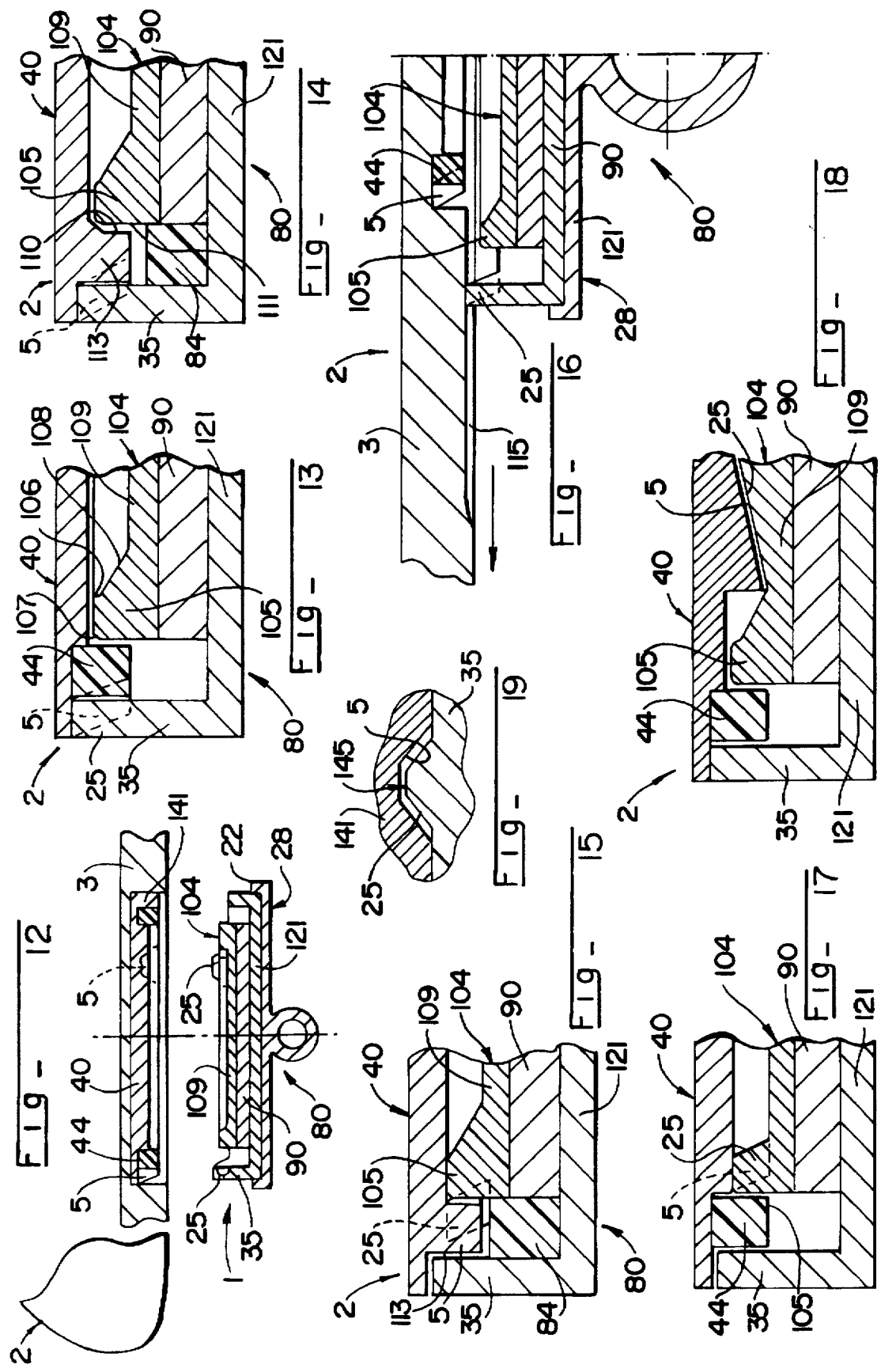

5,704,256

DEVICE FOR FASTENING A SHOE ON A PEDAL, AND SHOE AND PEDAL WITH SUCH A DEVICE

CROSS-REFERENCE TO RELATED APPLICATION

The present application is the national stage of PCT/94/FR00376.

BACKGROUND OF THE INVENTION

1. Field of the Invention

The present invention concerns a device for fastening a shoe on a pedal, more particularly suitable for fastening a cycling shoe on a bicycle pedal, of the safety type, i.e., designed so that the shoe and the pedal separate automatically in the event of an accident. The strength of the fastening being by design such that separation occurs.

The invention involves a device for fastening a shoe on a pedal which includes magnetic means fastened to the shoe and/or the pedal and magnetic metallic means attached to the pedal and/or the shoe. The magnetic metallic means, which are metallic means made from a magnetic metal and cooperate with the magnetic means, are referred to as metallic means hereinafter to simplify the description. A device of this kind has a small number of component parts; the invention is light in weight and very easy to maintain; the invention enables the cyclist to walk comfortably when wearing the shoes.

2. Discussion of Background

A fastening device of this kind, as described in JP-A-3 243 488, for example, must naturally also include spacing means causing one of the members to be moved away from the other, mechanically and against the action of magnetic forces. Fastening and unfastening of the shoe and of the pedal in normal use and automatic unfastening in the event of an accident require control of these operations simultaneously in terms of force and displacement. The device described in the document cited above does not provide such control, and the aim of the invention is to alleviate this major drawback.

SUMMARY OF THE INVENTION

In accordance with the invention, a device for fastening a shoe to a pedal comprises, firstly, magnetic means attached to the shoe and/or the pedal and metallic means attached to the shoe and/or the pedal. Secondly, spacing means are capable of moving the shoe and the pedal away from each other in the direction increasing the magnetic airgap. The spacing means are circumferential ramp means carried by said shoe and/or said pedal and such that relative rotation of said shoe and said pedal causes said movement of the shoe and the pedal away from each other.

With this arrangement, unfastening is better controlled, whether it is automatic in the event of an accident or intentional. The ramp means extend circumferentially along the surface of a cylinder of revolution the axis of which defines the rotation axis about which the shoe and the pedal rotate relative to each other when they are unfastened, said axis intersecting the area of the shoe to which the user applies pressure when pedalling. Engagement and releasing of the pedal by the shoe are then fast and easy, which is advantageous in the application of a fastening device of this kind to bicycles, especially "all terrain" bicycles.

Longitudinal and/or transverse abutment means are provided between the shoe and the pedal.

The magnetic means are carried by the shoe.

Alternatively, the magnetic means are carried by the pedal.

A protective plate covers the magnetic means.

Ramps of complementary shape are preferably attached to the shoe and the pedal.

The pedal advantageously includes a magnetic metal plate; the metal plate covers the bottom of a cup having a cylindrical edge; the cylindrical edge has ramps complementary to ramps carried by the shoe.

There is advantageously a circumferential clearance between the complementary ramps.

The metal plate is attached to a bushing adapted to receive a pedal spindle.

The metal plate is advantageously cup-shaped with a cylindrical rib carrying the ramp means.

The protective plate is preferably formed as a polepiece; the polepiece is bevelled.

An amagnetic ring surrounds the magnet.

The ramp means are carried by the amagnetic ring; alternatively, the ramp means are carried by the polepiece.

The sole of the shoe includes a guide member.

The magnetic means carried by the shoe or the pedal are advantageously in the form of a plurality of magnets disposed parallel to the transverse axis. A plurality of magnets is carried by the shoe and by the pedal, these magnets being of successively alternating polarity.

The magnetic means and the metallic means facing them are offset circumferentially.

The present invention further consists of a shoe and/or a pedal adapted to be fastened by means of a fastening device of this kind.

BRIEF DESCRIPTION OF THE DRAWINGS

For a better understanding of the invention, one embodiment shown in the appended drawings will now be described by way of non-limiting illustrative example only.

In the drawings:

FIG. 1 is a diagrammatic general view of a shoe and a pedal provided with a fastening device of the invention;

FIG. 2 is a part-sectioned view of the shoe of FIG. 1 at a larger scale;

FIG. 3 is a bottom view of part of the shoe on the line III—III in FIG. 2;

FIG. 4 shows the pedal from FIG. 1 in section;

FIG. 5 is a top view of the pedal on the line V—V in FIG. 4;

FIG. 6 is a part-sectioned view of another embodiment of fastening device of the invention;

FIG. 7 is a part-sectioned view of another embodiment of fastening device of the invention;

FIGS. 8 through 11 show various arrangements of magnetic means of the fastening device of the invention;

FIG. 12 shows part of another embodiment of fastening device of the invention;

FIG. 13 is a part-sectioned view of the device from FIG. 12, showing the shoe and the pedal fastened together;

FIG. 14 is analogous to FIG. 13, but shows a different embodiment;

FIG. 15 is analogous to FIG. 13, but shows a different embodiment;

FIG. 16 is a diagram showing the operation of the fastening device from FIG. 13, the shoe and the pedal being in the process of being fastened together;

FIG. 17 is analogous to FIG. 13 but shows a different embodiment;

FIG. 18 is analogous to FIG. 13 but shows a different embodiment;

FIG. 19 is a part-sectioned view showing ramp means of the fixing device.

DESCRIPTION OF THE PREFERRED EMBODIMENTS

FIG. 1 is a diagrammatic general view showing a cyclist's shoe 2 and a device 1 of the present invention for fastening the shoe to a pedal 20.

As shown in FIG. 2, which is a part-sectioned view of the shoe of FIG. 1 at a larger scale, and as shown in FIG. 3 which is a view on the line III—III in FIG. 2, the sole 3 of the shoe 2 is molded around magnetic means 30 comprising in this embodiment a circular magnet 31 made from a sintered metal alloy. This is an iron-neodymium-boron based magnet from 2 mm to 3 mm thick (3 mm in this example) and from 50 mm to 60 mm in diameter (55 mm in this example), for example. The outward facing face of the magnet 31 is protected by a magnetic metal protective plate 4 in the form of a circular cup having a bottom 6, a rim 7 and an annular lip 8. The rim 7 and the lip 8 constitute an annular ring 11 molded into the sole 3 so that only the bottom 6 is flush with the outside surface of the sole 3, or projects very slightly beyond that surface; an arrangement of this kind makes walking on the ground very comfortable. This level of comfort can be enhanced, if necessary, by providing transverse grooves 13 in the sole ahead of and behind the metal plate 4, to make the sole more flexible when walking. In the example shown the ring 11 is molded into the sole 3; it could naturally be attached to the sole in other ways, for example by screwing, by gluing, etc.

Circumferential ramps 5 are provided at the periphery of the rim 7 of the plate 4. Their function is explained later. There are preferably three of these ramps.

The shoe 2 is designed to cooperate with a pedal 20 shown in FIGS. 4 and 5. The pedal 20 comprises magnetic metallic means 40 adapted to cooperate magnetically with the magnetic means 30 on the shoe 2. In the embodiment of FIGS. 4 and 5, these metallic means 40 comprise a metal plate 21 the general shape of which is complementary to that of the protective plate 4 on the shoe 2. The metal plate 21 covers the bottom of a plastics or other material cup 28 of generally circular shape having a cylindrical edge 22. The edge 22 of the cup 28 has ramps 25 complementary to the ramps 5 on the plate 4 on the sole of the shoe. Under the bottom of the cup 28 is a bushing 23 adapted to receive a conventional pedal spindle 70. The interior circular section of the cup 28 at its rim 22 is slightly greater than the exterior section of the ring 11 of the shoe at the rim 7, naturally within the limit of the radial thickness of the ramps 5, 25 that are required to cooperate at least in part in all circumstances. Likewise, the ramps 5, 25 are not strictly complementary, there being a circumferential clearance between the ramps 5 and the ramps 25. There is, thus, a design clearance in all directions between the shoe and the pedal. It is known that this clearance is required to facilitate slight movement of the foot during pedalling and to enable a morphological fit without excessive stresses. To facilitate the user's grip on the pedal, the cup 28 is extended rearwardly by a tail 29 the end of which is curved slightly downwards, i.e. on the same side as the bushing 23. The tail 29 widens laterally in the perpendicular direction away from the axis of the bushing 23, lateral rims 61 joined to the cylindrical edge 22 of the cup 28 facilitating the approach of the shoe. The presence of the tail 29 unbalances the pedal 20 about the axis of the bushing 23 so that at rest the pedal 20 lies in a plane close to the vertical; it is known that this facilitates engagement of the pedal by the user.

The fastening device 1 of the invention operates in the following manner. As the fastening between the shoe 2 and the pedal 20 is magnetic in nature, it is maximum in the direction perpendicular to the pedal plate 21 when there is no distance or airgap between the plates 4 and 21: this is the position occupied by the bottom 6 of the shoe plate 4 and the pedal plate 21 when in contact with each other with the ramp means 5 and 25 fully mated together. In this position, it is known that the force opposing relative sliding between said plates 4 and 21 is small but non-zero, which provides the advantage of the clearance when pedalling mentioned above and avoids the need for spring means to take up this clearance. To separate the foot from the pedal 20, it merely has to rotate a few degrees, for example around 10°, for the magnetic attraction force to be substantially reduced as the magnetic airgap increases due to the ramps 5, 25, allowing the foot to separate easily from the pedal 20. The maximal attraction force can naturally be varied by changing the nature of the magnet or by providing non-magnetic airgap spacers of different thicknesses, or by making the protective plate from a non-magnetic material. It is also possible to make this force adjustable by means of three micrometer screws screwed into one of the two members, extending into and defining the size of the airgap.

Note that the fastening device 1 of the invention is extremely simple and very light in weight and that it releases automatically and immediately in the event of an accident, so that it can be classified as an automatic fastening device.

FIG. 6 shows an embodiment in which the shoe 2 is similar to that of FIG. 2 but in which the pedal 20 also carries a magnet 31A similar to the magnet 31 on the shoe 2, the magnet 31A being disposed on the side of the bottom of the cup 28 facing towards the shoe. The poles of the magnets 31 and 31A are arranged so that the magnets attract each other. The FIG. 6 embodiment offers additional means for obtaining the required magnetic fastening force. The magnet 31A can of course also be protected from external aggression in the same way as the magnet 31, for example by disposing a thin magnetic metal sheet over its outside face.

In FIGS. 2 and 6 the plate 4 and the ring 11 carried by the shoe are in one piece. In an alternative embodiment, not shown, the plate 4 protecting the magnet 31 and the circular ring 11 carrying the ramps 5 of the shoe are two separate parts. This enables the protective plate 4 to be shaped independently of the circular ring 11. The ring 11 is independent of the magnetic circuit and can be made from an amagnetic material and/or advantageously of large diameter, the pedal ramp means being located accordingly: the plate 4 and the magnet 31 are rectangular, for example. In this embodiment the ring 11, if it is made of metal, has a U-shape section with the bottom of the section stamped at spaced locations to form inclined planes constituting the ramps of the shoe.

In the embodiments described with reference to FIGS. 2 through 6, the ramp means are constituted by complementary ramps carried by the shoe and by the pedal. It will be understood that the desired aim can also be achieved if only the shoe or only the pedal carries ramps cooperating with ramp following means carried by the pedal or the shoe, respectively. For example, the ramp 25 on the pedal 20 can each cooperate with the edge of an opening in the protective plate 4 attached to the shoe 2. Of course, if a circular ring 11 independent of the plate 4 is used, these openings are in the ring.

It goes without saying that everything stated so far, and everything that follows, with regard to the shoe, on the one hand, and the pedal, on the other hand, can be interchanged. In other words, anything concerning the shoe can apply to the pedal, and vice versa.

The magnetic means carried by the shoe and/or the pedal have been described thus far as comprising a magnet of any shape: circular, square, rectangular, polygonal. The magnetic means may equally well comprise a plurality of magnets 32: disk-shaped magnets (FIG. 8), bar-shaped magnets (FIG. 9). If a plurality of magnets is carried by the shoe, the magnets are advantageously disposed so that parallel strips 132 without magnets extend perpendicularly to the direction of walking. This embodiment is shown in FIGS. 8 and 9, and enables the sole of the shoe to be made flexible to make walking on the ground more comfortable.

When a plurality of magnets is carried by the shoe or the pedal, the magnets are of the same polarity. When a plurality of magnets is carried by the shoe and by the pedal, the polarities of these magnets are advantageously successively alternating, as shown diagrammatically in FIG. 10. If the angle at the center corresponding to each polarity is equal to the angle subtended by the ramp means, for one extreme position of the ramps the attraction force is maximal whereas for the other extreme position there is a repulsive force: this facilitates separation of the shoe from the pedal in this latter extreme position.

In the embodiment shown in FIG. 11 the magnets 131 on the shoe have the same polarity and the metallic means 140 on the pedal are aligned with the magnets 131 only in the fastening position. Accordingly, after rotation through an angle corresponding to the sectors subtended by the magnets 131 and the metallic means 140, there is no longer any attraction or any repulsion and the shoe is easily separated from the pedal. In FIG. 11 said rotation has not been completed but the force of attraction has already been reduced by virtue of the partial rotation indicated.

Because sintered magnets, which have a high remanent field and a high coercive field, are fragile it is necessary to use a protective metal plate. This protective plate is not needed if the magnets are metal magnets. In this latter case it may be beneficial to provide a metal plate to close the magnetic field. Accordingly, in FIG. 7, the magnetic means 30 are disposed between the metallic means 40 forming the cup 28 previously described and a closure plate 41. In this embodiment the plate 41 is attached to the circular ring 11. The magnetic means 30 are shown attached to the plate 41 carried by the shoe 2, but they could be carried by the metallic means attached to the pedal 20.

An alternative embodiment of this kind is shown in FIGS. 12 and 13. In this embodiment, the sole 3 of the shoe 2 carries metallic means 40 in the form of circular section plates having a cylindrical skirt 141 at the periphery into which are cut outwardly open, generally U-shaped ramps 5 the branches of which are inclined to constitute the ramps proper, as shown in FIG. 19. In the example shown, there are three ramp means 5 offset by 120°, with one at the front of and on the longitudinal axis of the sole 3. The pedal 80 includes an amagnetic material (for example a plastics material or light alloy) cup 28 having a rim 22 and which supports, for example by being molded onto, a magnetic metal plate 121 that is also circular and has a rim 35 on which are provided the ramp means 25 complementary to the ramp means 5. Of course, in an alternative embodiment, not shown, the amagnetic material cup 28 could be dispensed with, so that the pedal spindle 80 is carried directly by the metal plate 121. A disk-shaped magnet 90 is attached, for example glued, to the center of the metal plate 121. As previously mentioned in connection with sintered magnets, the magnet 90 is protected by a metal plate 104 attached, for example glued, to the magnet 90. It is equally possible to fasten together the combination of the metal plate 104, the magnet 90 and the metal plate 121 in other ways, for example by riveting, crimping, molding, etc. In the embodiment of FIGS. 12 and 13 the plate 104 forms a polepiece: the polepiece 104, seen more clearly in FIG. 13, has a disk-shaped plane part 109 extended at the periphery by an annular pole horn 105 in the shape of a body of revolution the extreme edges of which have bevels 107 and 106, the inside bevel 106 being joined to the disk 109 by a frusto-conical wall 108. Where magnetic fastening is concerned, this embodiment has a major advantage over the embodiments described so far: the fastening device can have a smaller overall size for the same required force of attraction. The lines of magnetic force from the magnet 90 pass through the pole horn 105, the metallic means 40 and the ramp means 5, 25 and return to the magnet 90 via the metal plate 121 and its rim 35. There is a radial clearance between the magnet 90 and the rim 35 of the metal plate 121. As shown in FIG. 13, the metal plate 121 and the metallic means 40 are in contact whereas a narrow airgap is provided between the pole horn 105 and the metallic means 40. All other things being equal, the narrower the airgap the stronger the magnetic attraction, but a design with no airgap at all would require great accuracy in the manufacture of the components, which would add to the overall unit cost. For this reason an airgap is intentionally provided at the position of the pole horn 105, combined with contact at the rim 35, which is at a greater radius than the pole horn 105. Thus, the rim 35 of the metal plate 121 is in contact with the cylindrical skirt 141 of the metallic means 40, the axial distance between the ramps 5 and 25 being at most equal to the airgap at the pole horn 105, as can be seen in FIG. 19. For example, for an iron-neodymium-boron magnet that is 3 mm thick and 35 mm in diameter, a metal plate 121 that is 2 mm thick and 46 mm in diameter, a pole horn 105 the end of which has a radial length of 2.5 mm, and an airgap of approximately 1.5 mm, the axial force fastening the shoe 2 to the pedal 80 is greater than 20 kg.

The outward facing face of the metallic means 40 of the shoe 2 carries an amagnetic material, for example plastics material or amagnetic metal, washer 44 the thickness of which in the radial direction is slightly less than the radial clearance between the magnet 90 and the plate 104, on the one hand, and the rim 35 of the metal plate 121, on the other hand. This thickness allows the washer 44 to locate in said clearance when the shoe 2 and the pedal 80 are fastened together as shown in FIG. 13. The washer 44, fastened, for example, glued, to the metallic means 40, constitutes guide means for the shoe 2 for engaging the pedal 80. To engage the pedal, the shoe 2 is moved towards it, from right to left as shown in FIGS. 12 and 13. During this movement the ramp means 25 at the rear of the pedal 80 (which project relative to the plate 104 in this example, whereas the ramp means 5 are recessed) constitute guide studs for the outside periphery of the washer 44 which is therefore transversely centered relative to the pedal. Similar centering is obtained if, in an alternative embodiment, the ramp means 25 are recessed and the ramp means 5 project, in which case the washer 44 is carried by the pedal 80.

The longitudinal centering can be initiated by guiding the ramp means 25 at the top of the pedal 80 into a longitudinal groove 115 on the surface of the sole 3 of the shoe 2, as shown in FIG. 16 where the arrow indicates the direction of movement of the shoe 2 relative to the pedal 80 upon engaging the latter.

This guidance can be complemented by centering of the circular members consisting of the metallic means 40 on the shoe and the plate 104 on the pedal. In the FIG. 14 embodiment, the metallic means 40 have an interior skirt 113 the bottom wall 110 of which has a slightly conical shape of revolution, as is the complementary exterior wall 111 of the plate 104. Of course, the interior skirt 113 of the metallic means 40 could be replaced by an amagnetic material washer similar to the washer 44 of FIG. 12, in which case it is this amagnetic washer which has a slightly conical interior wall like the wall 110 that is the shape of a body of revolution. This FIG. 14 embodiment also shows that it is possible to provide an amagnetic material, for example a plastics material, annular washer 84 between the magnet 90 and the rim 35: a washer 84 of this kind centers the magnet 90 on the metal plate 121 while the magnet 90 being bonded.

In the description so far the ramp means 5, 25 have been provided at the periphery of the metallic means 40 and the rim 35 of the plate 121. They can instead be disposed radially. Referring to FIG. 15, the washer 84 for centering the magnet 90 carries the ramp means 25 of the pedal while the ramp means 5 of the shoe are carried by the interior skirt 113 of the plate 40 disposed radially in line with the washer 84. Of course, here again, as in FIG. 14, the interior skirt 113 could be replaced by an amagnetic washer similar to the washer 44 in FIG. 12, in which case it is this amagnetic washer that carries the shoe ramp means 5. In the FIG. 15 embodiment there is no airgap between the polepiece 105 and the metallic means 40 but there is an airgap between the metallic means 40 and the rim 35 of the metal plate 121. In FIG. 17 the ramp means 5, 25 are in line with the pole horn 105. In FIG. 18, the ramp means 5, 25 are centrally located: the central upper part of the plate 109, surrounded by the pole horn 105, forms an undulating conical surface 25 constituting the pedal ramp means, the central interior face 5 of the metallic means 40 having a complementary undulating conical shape to constitute the shoe ramp means.

To facilitate the approach of the shoe to the pedal in the correct position in which the ramp means of the two members are centered, magnetic self-centering can be obtained by making the magnetic means and the metallic means annular, for example. Thus in a different embodiment, not shown, an annular magnet is carried by the pedal and an annular closure plate is carried by the shoe.

As already explained, the ramp means can be part of the magnetic circuit, or not. The ramp means can be disposed on a large diameter around the magnetic circuit. Advantageously, the ramp means are symmetrical in the circumferential direction, they not only avoid the need for a dedicated lefthand side or righthand side connecting device, but also free the user to separate the two members in any direction, at their convenience, and at the same time define one or more pegs consisting in the upper part 145 of the male ramp means for guiding the members when they are in use (FIG. 19). There can be any number of ramp means, for example two ramp means, disposed in diametrically opposed positions along the pedal axis, but it is preferable to provide at least three ramp means for even better controlled separation of the two members which, during separation, move parallel to each other, the airgap increasing in a circumferentially uniform manner. Of course, if two ramp means are provided the pegs that they define then cooperate with two guide grooves provided in the sole of the shoe, or with the sides of a common longitudinal boss. The ramps can also have any profile, for example a straight or a geartooth profile: experience has shown that separation after relative rotation of the two members through an angle in the order of about 10° is very satisfactory.

I claim:

1. A device for fastening a shoe to a pedal, comprising:
   a magnetic element attached to at least one of the shoe and the pedal;
   a metallic element attached to at least one of the shoe and the pedal; and
   a spacer system capable of moving the shoe and the pedal away from each other in a direction increasing a magnetic airgap, wherein the spacer system comprises circumferential ramps carried by at least one of the shoe and the pedal, and wherein relative rotation of the shoe and the pedal causes said movement of the shoe and the pedal away from each other.

2. The fastening device of claim 1, further comprising at least one of longitudinal abutment means and transverse abutment means provided between the shoe and the pedal.

3. The fastening device of claim 1, wherein the circumferential ramps are complementary shaped ramps attached to the shoe and the pedal.

4. The fastening device of claim 1, wherein the circumferential ramps are independent of the magnetic circuit.

5. The fastening device of claim 1, wherein there is a circumferential clearance between the circumferential ramps which are complementary.

6. The fastening device of claim 1, wherein a sole of the shoe has a guide member.

7. The fastening device of claim 1, wherein the magnetic element comprises a plurality of magnets disposed parallel to an axis transverse to at least one of the shoe and the pedal.

8. The fastening device of claim 1, wherein the magnetic element and metallic element facing the magnetic element are offset circumferentially.

9. The fastening device of claim 1, wherein the magnetic element is attached to the shoe.

10. The fastening device of claim 9, wherein the magnetic element comprises a plurality of magnets carried by the shoe and by the pedal, and wherein the magnets are arranged in successively alternating polarity.

11. The fastening device of claim 1, wherein the magnetic element is attached to the pedal.

12. The fastening device of claim 11, wherein the magnetic element comprises a plurality of magnets carried by the shoe and by the pedal, and wherein the magnets are arranged in successively alternating polarity.

13. The fastening device of claim 1, wherein the magnetic element is surrounded by an amagnetic ring.

14. The fastening device of claim 13, wherein some of the circumferential ramps are carried by the amagnetic ring.

15. The fastening device of claim 1, wherein the magnetic element is covered by a protective plate.

16. The fastening device of claim 15, wherein the protective plate comprises a polepiece.

17. The fastening device of claim 16, wherein the polepiece has bevels.

18. The fastening device of claim 16, wherein some of the ramps are carried by the polepiece.

19. The fastening device of claim 1, wherein the pedal comprises a metal plate.

20. The fastening device of claim 19, wherein the metal plate is attached to a bushing adapted to receive a pedal spindle.

21. The fastening device of claim 19, wherein the metal plate is a cup having a cylindrical rim carrying some of the circumferential ramps.

22. The fastening device of claim 19, wherein the metal plate covers a bottom of a cup having a cylindrical edge.

23. The fastening device of claim 22, wherein the cylindrical edge has some of the circumferential ramps which are complementary to other circumferential ramps which are carried by the shoe.

24. A shoe which can be fastened to a pedal by a fastening device, wherein the fastening device comprises:

a magnetic element attached to at least one of the shoe and the pedal;

a metallic element attached to at least one of the shoe and the pedal; and a spacer system capable of moving the shoe and the pedal away from each other in a direction increasing a magnetic airgap, wherein the spacer system comprises circumferential ramps carried by at least one of the shoe and the pedal, and wherein relative rotation of the shoe and the pedal causes said movement of the shoe and the pedal away from each other.

25. A pedal which can be fastened to a shoe by a fastening device, wherein the fastening device comprises:

a magnetic element attached to at least one of the shoe and the pedal;

a metallic element attached to at least one of the shoe and the pedal; and a spacer system capable of moving the shoe and the pedal away from each other in a direction increasing a magnetic airgap, wherein the spacer system comprises circumferential ramps carried by at least one of the shoe and the pedal, and wherein relative rotation of the shoe and the pedal causes said movement of the shoe and the pedal away from each other.

* * * * *